United States Patent
Vandewall et al.

(10) Patent No.: US 12,195,186 B2
(45) Date of Patent: Jan. 14, 2025

(54) ADAPTABLE SEAT SYSTEMS AND METHODS FOR AN INTERNAL CABIN OF AN AIRCRAFT

(71) Applicant: THE BOEING COMPANY, Arlington, VA (US)

(72) Inventors: Cynthia Vandewall, Snohomish, WA (US); Jared Bowen, Lynnwood, WA (US); Alejandro Lozano Robledo, Cincinnati, OH (US); Juan Sebastian Ramirez Loaiza, Cincinnati, OH (US); Rebecah Pelle, Melbourne, KY (US); Zichun Gao, Cincinnati, OH (US); Yifei Wu, Cincinnati, OH (US)

(73) Assignee: The Boeing Company, Arlington, VA (US)

( * ) Notice: Subject to any disclaimer, the term of this patent is extended or adjusted under 35 U.S.C. 154(b) by 143 days.

(21) Appl. No.: 18/159,776

(22) Filed: Jan. 26, 2023

(65) Prior Publication Data
US 2024/0253788 A1      Aug. 1, 2024

(51) Int. Cl.
*B64D 11/06*      (2006.01)
(52) U.S. Cl.
CPC ........ *B64D 11/064* (2014.12); *B64D 11/0606* (2014.12); *B64D 11/0638* (2014.12)
(58) Field of Classification Search
CPC .............. B64D 11/064; B64D 11/0606; B64D 11/0638
USPC ........................................... 297/283.3, 283.1
See application file for complete search history.

(56) References Cited

U.S. PATENT DOCUMENTS

| | | | | |
|---|---|---|---|---|
| 923,197 | A * | 6/1909 | Murchison | A47C 7/48 297/74 |
| 1,096,678 | A * | 5/1914 | Budd | B60N 2/1828 297/367 R |
| 1,443,479 | A * | 1/1923 | Lambert | B61D 33/0028 297/94 |
| 4,487,452 | A * | 12/1984 | Tanizaki | B60N 2/143 297/344.22 |
| 6,715,825 | B2 * | 4/2004 | Tame | B60N 2/203 297/94 |
| 10,479,233 | B2 * | 11/2019 | Minato | B60N 2/22 |
| 10,858,111 | B2 * | 12/2020 | Lin | B60N 2/3047 |
| 10,934,000 | B2 * | 3/2021 | Ehlers | B60N 2/77 |
| 10,960,839 | B2 * | 3/2021 | Imura | B60R 21/214 |
| 11,731,740 | B1 * | 8/2023 | Hamilton, Sr. | B63B 29/06 114/363 |
| 2005/0253433 | A1 * | 11/2005 | Brown | B60N 2/233 297/283.3 |
| 2007/0126270 | A1 * | 6/2007 | Saint-Jalmes | B64D 11/0601 297/283.3 |
| 2018/0281961 | A1 * | 10/2018 | Mariat | B64D 11/0638 |
| 2021/0107656 | A1 * | 4/2021 | Vandewall | B64D 11/0015 |
| 2021/0214087 | A1 * | 7/2021 | Moe | B64D 11/0606 |
| 2023/0331388 | A1 * | 10/2023 | Stewart | B64D 11/0606 |

* cited by examiner

*Primary Examiner* — Jose V Chen
(74) *Attorney, Agent, or Firm* — Joseph M. Butscher; The Small Patent Law Group LLC

(57) ABSTRACT

A seat system is configured to be within an internal cabin of an aircraft. The seat system includes one or more seat supports configured to support one or more seated passengers. One or more backrests are moveably secured to the one or more seat supports. The one or more backrests are selectively moveable between a forward-facing position and a rearward-facing position.

22 Claims, 6 Drawing Sheets

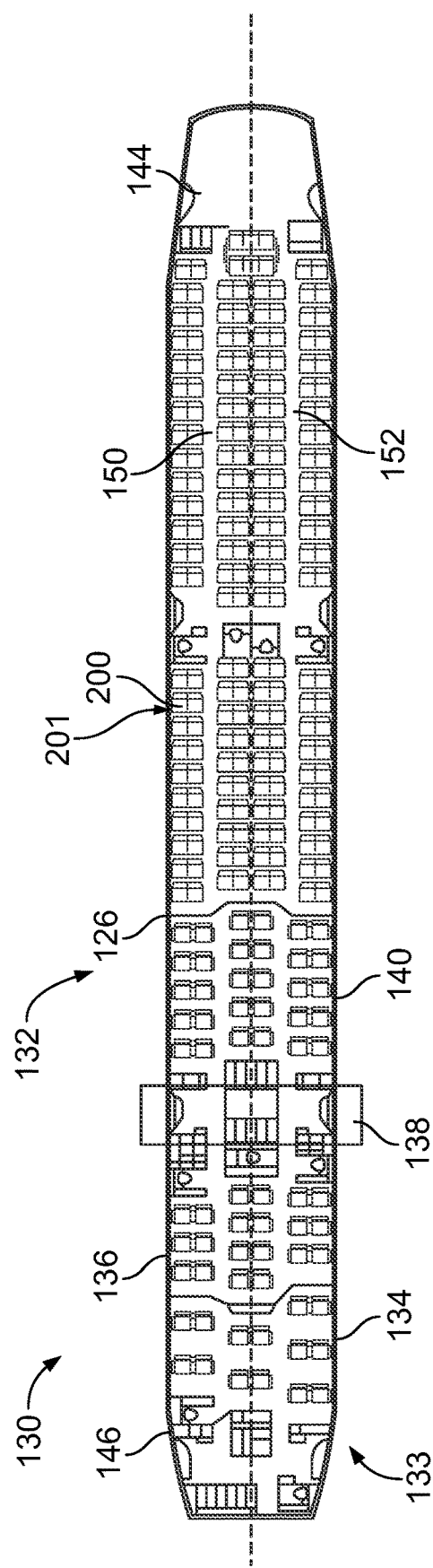
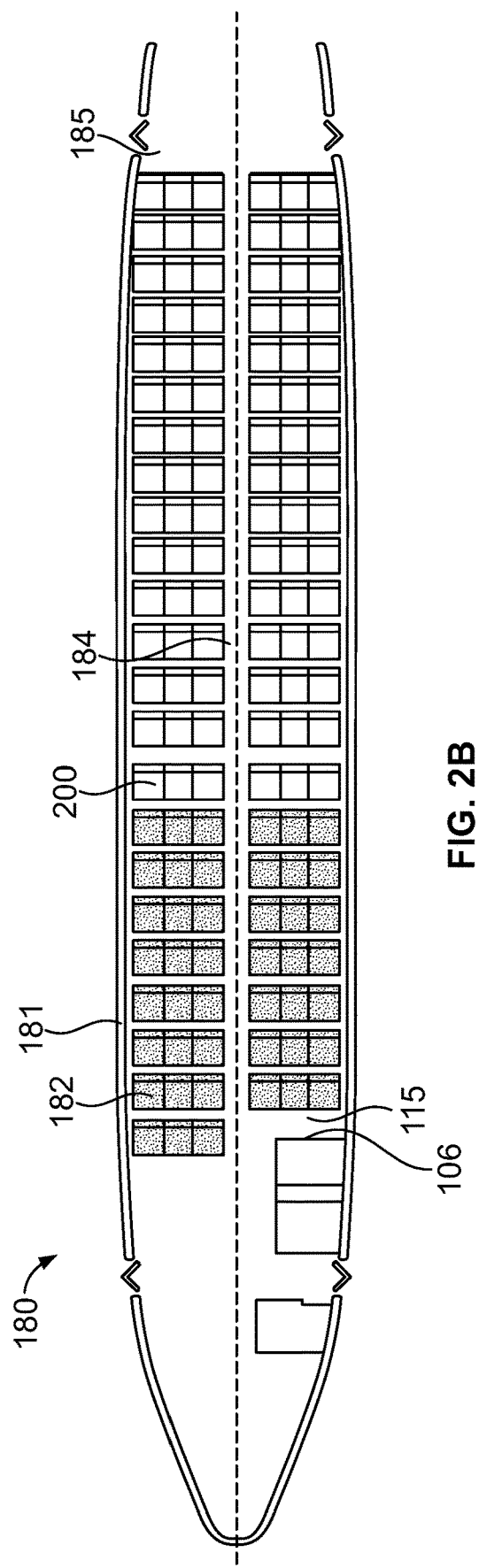
FIG. 2A
FIG. 2B

ADAPTABLE SEAT SYSTEMS AND METHODS FOR AN INTERNAL CABIN OF AN AIRCRAFT

FIELD OF THE DISCLOSURE

Examples of the present disclosure generally relate to adaptable seat systems and methods for an internal cabin of an aircraft.

BACKGROUND OF THE DISCLOSURE

Aircraft are used to transport passengers and cargo between various locations. A typical commercial aircraft includes a passenger seating area within an internal cabin. Passenger seats are arranged in rows. For example, a row within the internal cabin includes a first set of two or three seats separated from a second set of two or three seats by a portion of an aisle that extends between the first and second sets of seats.

Certain associated groups of passengers may be onboard an aircraft. As an example, a family of four or more individuals may be passengers within the internal cabin. The group may be seated in different rows. Thus, members the group may find conversations with the entire group difficult as certain members of the group are seated in a different row, in front of other members of the group.

In general, current seating arrangements within typical commercial aircraft may not allow for easy communication with others. In particular, when every passenger is facing forward, conversation with others may not be easy without annoying other passengers. In some cases, families and friends may have to sit separately due to lack of a particular number of available seats next to each other.

SUMMARY OF THE DISCLOSURE

A need exists for systems and methods for accommodating groups within an internal cabin of an aircraft. Further, a need exists for an adaptable seating system and a method that allow for socialization among groups of passengers without affecting flight experiences of other passengers.

With those needs in mind, certain examples of the present disclosure provide a seat system configured to be within an internal cabin of an aircraft. The seat system includes one or more seat supports configured to support one or more seated passengers, and one or more backrests moveably secured to the one or more seat supports. The one or more backrests are selectively moveable between a forward-facing position and a rearward-facing position.

In at least one example, the one or more backrests in the rearward-facing position are configured to provide a group zone with another seat system behind the seat system.

The seat systems can include one or more bases configured to be secured to seat tracks within the internal cabin.

In at least one example, the one or more seat supports include one or more tracks that slidably support one or more couplers that connects to the one or more backrests. The one or more backrests can be configured to slide between the forward-facing position and the rearward-facing position.

The one or more seat supports and the one or more backrests can provide a first passenger seating portion and a second passenger seating portion. The first passenger seating portion and the second passenger seating portion can be individual passenger seats. As another example, the first passenger seating portion is an individual passenger seat, and the second passenger seating portion is a multi-passenger seat.

The seat system can also include one or more partitions configured to separate different groups of passengers. For example, the one or more partitions can be secured to the one or more backrests.

The seat system can also include one or more moveable tables coupled to the one or more backrests.

Certain examples of the present disclosure provide an aircraft including an internal cabin, and seat systems within the internal cabin, as described herein.

Certain examples of the present disclosure provide a method within an internal cabin of an aircraft. The method includes selectively moving one or more backrests secured to one or more seat supports configured to support one or more seated passengers within the internal cabin of the aircraft between a forward-facing position and a rearward-facing position.

BRIEF DESCRIPTION OF THE DRAWINGS

FIG. 2A illustrates a top plan view of an internal cabin of an aircraft, according to an example of the present disclosure.

FIG. 2B illustrates a top plan view of an internal cabin of an aircraft, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a seat system that includes a backrest that is configured to be selectively moved from a back of the system to a front to allow the passenger to face individuals seated in different rows. The seating system is selectively moveable between a forward facing position, such as a standard configuration, and a
} rearward facing position, such as a group configuration. In the group configuration, the seating system allows groups of passengers in different rows to face each other.

Figure 1:
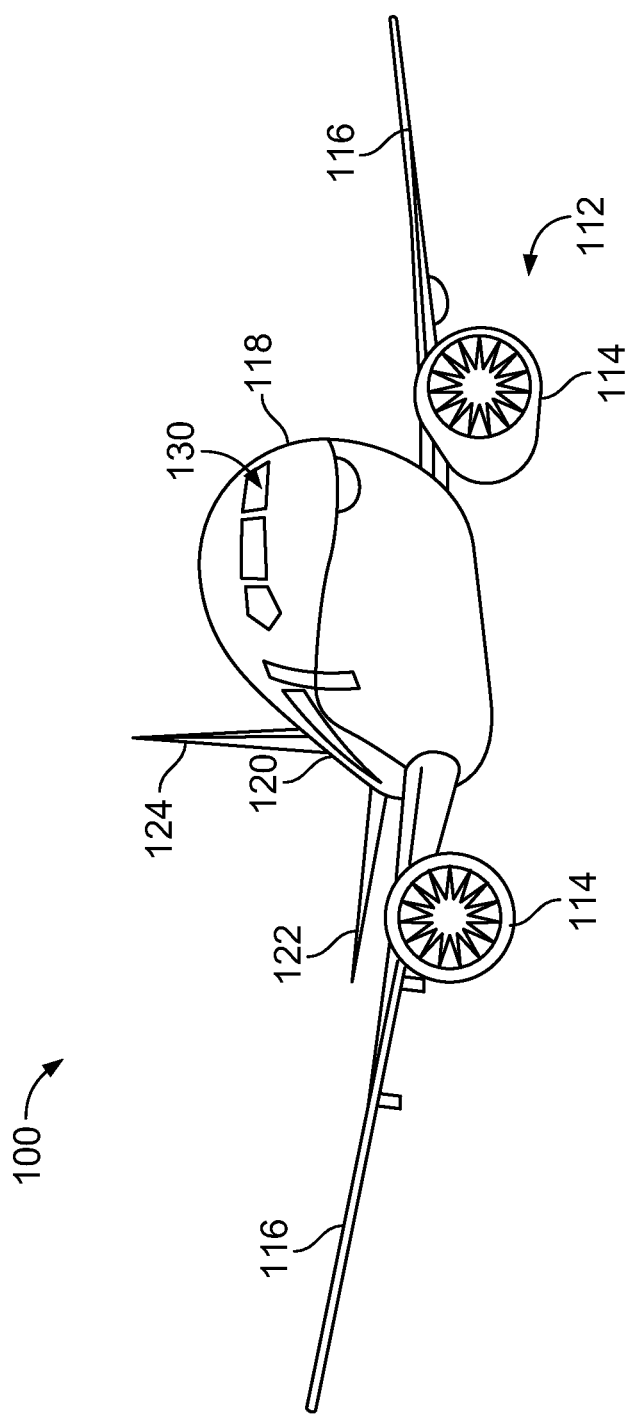
FIG. 1 illustrates a perspective front view of an aircraft, according to an example of the present disclosure.

FIG. 1 illustrates a perspective front view of an aircraft 100, according to an example of the present disclosure. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124. The fuselage 118 of the aircraft 100 defines an internal cabin 130, which includes a flight deck or cockpit, one or more work sections (for example, galleys, personnel carry-on baggage areas, and the like), one or more passenger sections (for example, first class, business class, and coach sections), one or more lavatories, and/or the like. FIG. 1 shows an example of an aircraft 100. It is to be understood that the aircraft 100 can be sized, shaped, and configured differently than shown in FIG. 1.

FIG. 2A illustrates a top plan view of an internal cabin 130 of an aircraft, according to an example of the present disclosure. The internal cabin 130 may be within a fuselage 132 of the aircraft. For example, one or more fuselage walls may define an interior of the internal cabin 130. The interior of the internal cabin 130 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 130.

The internal cabin 130 includes multiple sections, including a front section 133, a first class section 134, a business class section 136, a front galley station 138, an expanded economy or coach section 140, a standard economy or coach section 142, and an aft section 144, which may include multiple lavatories and galley stations. It is to be understood that the internal cabin 130 may include more or less sections than shown. For example, the internal cabin 130 may not include a first class section, and may include more or less galley stations than shown.

As shown in FIG. 2A, the internal cabin 130 includes two aisles 150 and 152 that lead to the aft section 144. Optionally, the internal cabin 130 may have less or more aisles than shown. For example, the internal cabin 130 may include a single aisle that extends through the center of the internal cabin 130 that leads to the aft section 144.

Seat systems 200 are positioned throughout the internal cabin 130. The seat systems 200 may be arranged in rows 201. As described herein, at least some of the seat systems 200 are configured to be selectively moved between forward-facing positions and rearward-facing positions. When a seat system 200 within a first row is moved to a rearward-facing position to face a forward-facing position of a seat system 200 within a second row behind the first row, a group zone is formed within the internal cabin 130.

FIG. 2B illustrates a top plan view of an internal cabin 180 of an aircraft, according to an example of the present disclosure. The internal cabin 180 may be within a fuselage 181 of the aircraft. For example, one or more fuselage walls may define the interior of the internal cabin 180. The internal cabin 180 includes multiple sections, including a main cabin 182 having one or more seat systems 200, and an aft section 185 behind the main cabin 182. It is to be understood that the internal cabin 180 may include more or less sections than shown.

The internal cabin 180 may include a single aisle 184 that leads to the aft section 185. The single aisle 184 may extend through the center of the internal cabin 180 that leads to the aft section 185. For example, the single aisle 184 may be coaxially aligned with a central longitudinal plane of the internal cabin 180.

Figure 3:
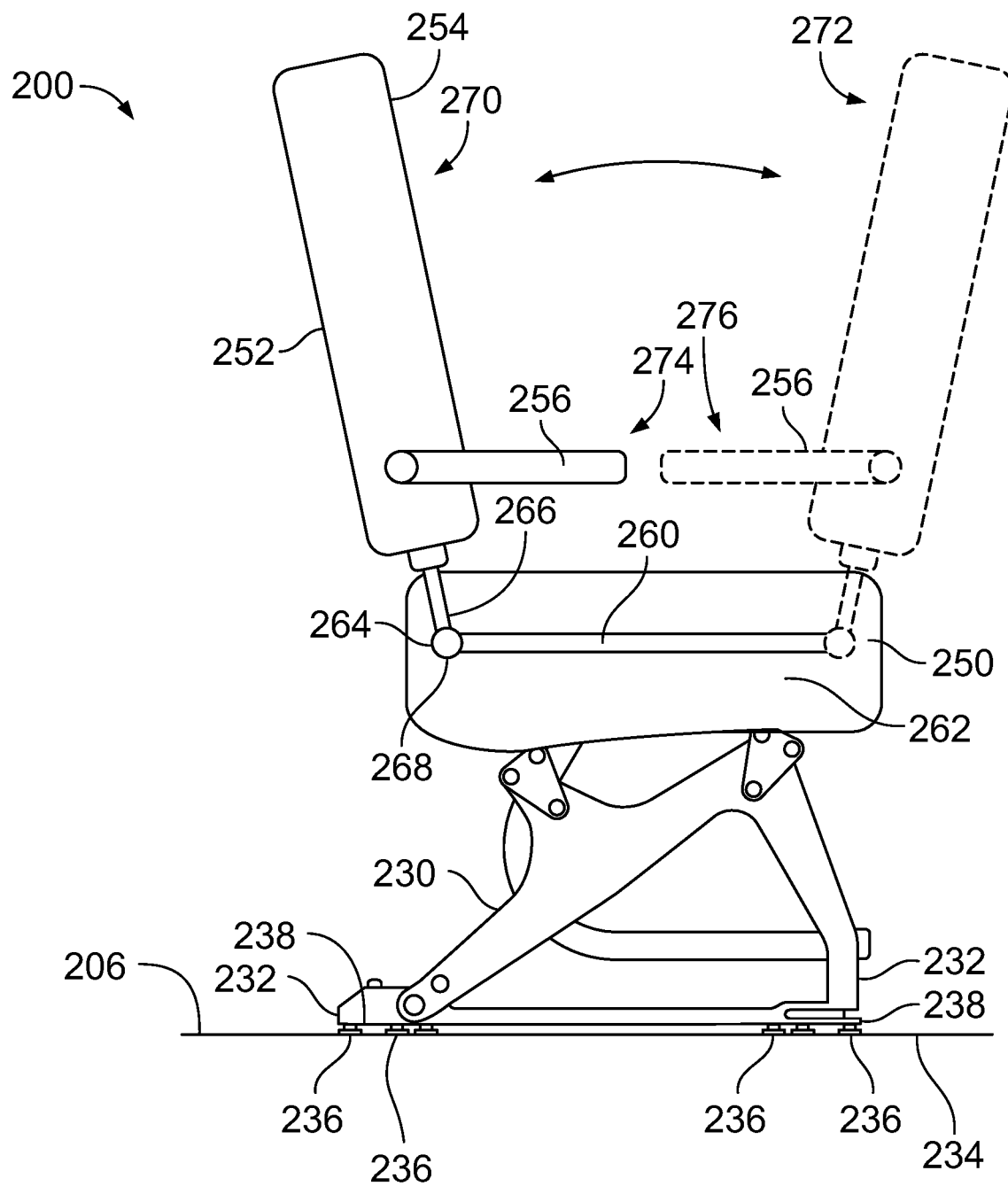
FIG. 3 illustrates a side view of a seat system, according to an example of the present disclosure.

FIG. 3 illustrates a side view of a seat system 200, according to an example of the present disclosure. The seat system 200 is configured to be secured within an internal cabin of a vehicle, such as a commercial aircraft.

The seat system 200 includes a base 230, which may include legs 232 that may be secured to seat tracks 234 secured to a floor 206 within a cabin of an aircraft. In at least one example, securing studs 236 (such as shear studs) downwardly extend from lower surfaces 238 of the legs 232. The securing studs 236 are securely retained within the seat tracks 234. The seat tracks 234 are configured to securely couple to the securing studs 236 to secure the seat system 200 in place. The base 230 supports a seat support 250 and a backrest 252, which can include a headrest 254. The seat support 250 is configured to support a seated passenger. For example, the seat support includes a basin, cushion, and/or the like on which a passenger sits. One or more arm rests 256 may be pivotally secured to the backrest 252.

The seat system 200 may be sized and shaped differently than shown in FIG. 3. The seat assembly 200 may include more or less components than shown in FIG. 3. It is to be understood that the seat assembly 200 shown in FIG. 3 is merely one example of a seat system that may be disposed within an internal cabin of a vehicle.

The seat support 250 includes a track 260 formed therein. For example, the track 260 extends along a length of one or both sides 262 of the seat support 250. The track 260 includes one or more rails, channels, and/or the like that slidably support a coupler 264 for the backrest 252. For example, the coupler 264 can be an axle, pin, bearing, and/or the like that is configured to be slidably retained within the track 260. A beam 266 extends outwardly and upwardly from an end 268 of the coupler 264 extending outwardly from the track 260. The beam 266 securely connects the backrest 252 to the coupler 264. The beam 266 is pivotal with respect to the coupler 264.

The backrest 252 is configured to be selectively moved between a forward-facing position 270, and a rearward-facing position 272. For example, the backrest 252 can be slid between the forward-facing position 270 and the rearward-facing position by way of the coupler(s) 264 sliding along the track(s) 260. The backrest 252 can be further pivoted to a desired reclination angle via the pivotal connection between the beam(s) 266 and the coupler(s) 264.

The backrest 252 can include one or more locks that selectively lock the backrest 252 in a desired position, such as the forward-facing position 270 or the rearward-facing position 272. The armrest(s) 256 may also be pivoted and rotated accordingly between a forward-facing orientation 256 and a rearward-facing orientation 276. Optionally, the seating system 200 may not include one or both armrests 256.

Optionally, the backrest 252 can be moveably coupled to the seat support 250 through various other mechanisms. For example, the seat support 250 can include an outwardly-protruding rail on which a reciprocal slide clip of the backrest 252 secures. As another example, the backrest 252 can include one or more wheels that rotatably couple to a track, rail, or the like of the seat support 250.

As described herein, the seat system 200 is configured to be within an internal cabin of an aircraft. The seat system 200 includes one or more seat supports 250 configured to support one or more seated passengers, and one or more backrests 254 moveably secured to the one or more seat supports 250. The backrest(s) 254 is selectively moveable between the forward-facing position 274 (in which the passenger seated on the seat support 250 faces forward with the backrest 254 supporting his/her back) and the rearward-facing position 276 (in which the passenger seated on the seat support 250 faces rearward with the backrest 254 support his/her back).

Figure 4:
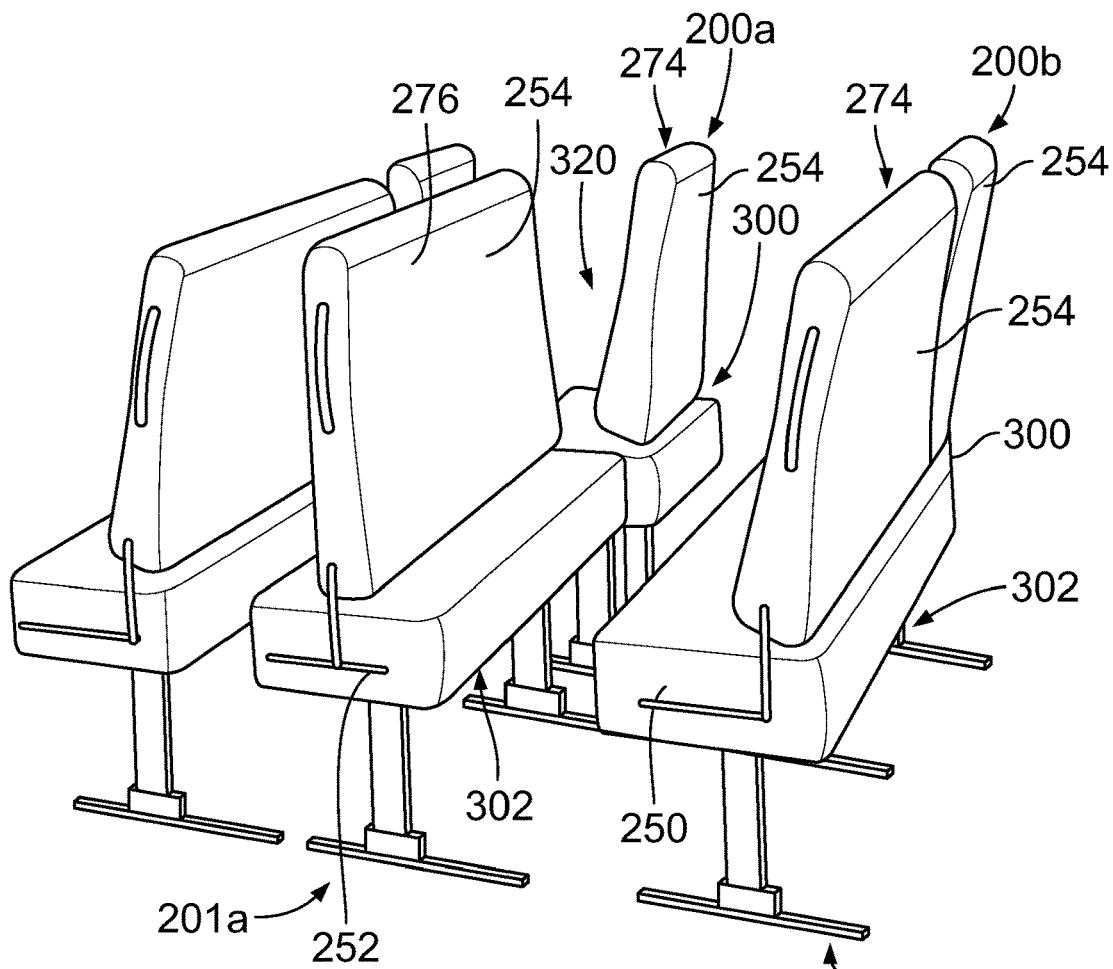
FIG. 4 illustrates a perspective lateral view of a first seating system in a first row and a second seating system in a second row behind the first row, according to an example of the present disclosure.

FIG. 4 illustrates a perspective lateral view of a first seating system 200a in a first row 201a and a second seating system 200b in a second row 201b behind the first row, according to an example of the present disclosure. The seating systems 200a and 200b can include multiple passenger seats. For example, the seating systems 200a and 200b can include a first passenger seat portion, such as an individual passenger seat 300 and a second passenger seat portion, such as a multi-passenger seat 302, such as a bench that can accommodate two or more passengers. The multi-passenger seats 302 in immediately neighboring rows 201a and 201b (that is, two rows without another row therebetween) can be linearly aligned with one another (for example, the multi-passenger seat 302 within the row 201a is directly in front of the multi-passenger seat 302 within the row 201b). Similarly, the individual passenger seats 300 in immediately neighboring rows 201a and 201b can be linearly aligned with one another. As another example, each of the first passenger seat portion and the second passenger seat portion can be individual passenger seats. The first passenger seat portion and the second passenger seat portion can move independently from one another between the forward-facing position 274 and the rearward-facing position 276.

Optionally, the seating systems 200a and 200b can include only single seats. For example, each seating system 200a and 200b can include a three single seats coupled together. As another example, the seating systems 200a and 200b can include only multi-passenger seats. For example, each seating system 200a and 200b can include a single bench configured to accommodate three or more passengers.

As shown, the backrests 254 of the seating systems 200a and 200b can be selectively moved between forward-facing positions 274 and rearward-facing positions. When the backrests 254 of the seating system 200a are in the rearward-facing positions 276 and the backrests 254 of the seating system 200b are in the forward-facing positions 274, a group zone 320 is formed that allow passengers within the different rows 201a and 201b to face one another.

As shown, portions of each of the seating systems 200a and 200b may be independently moveable from one another. For example, the individual passenger seat 300 of each of the seating systems 200a and 200b can be independently moveable from the multi-passenger seat 302, to allow different portions of the seating systems 200a and 200b to be in different positions. For example, the individual passenger seat 300 of the seating system 200a can be in the forward-facing position 274, while the multi-passenger seat 302 of the seating system 200a can be in the rearward-facing position 276, or vice versa. The individual passenger seat 300 and the multi-passenger seat 302 of the seating system 200a can both be in either the forward-facing position 274 or the rearward-facing position 276, or one can be in the forward-facing position 274, while the other is in the rearward-facing position 276.

Figure 5:
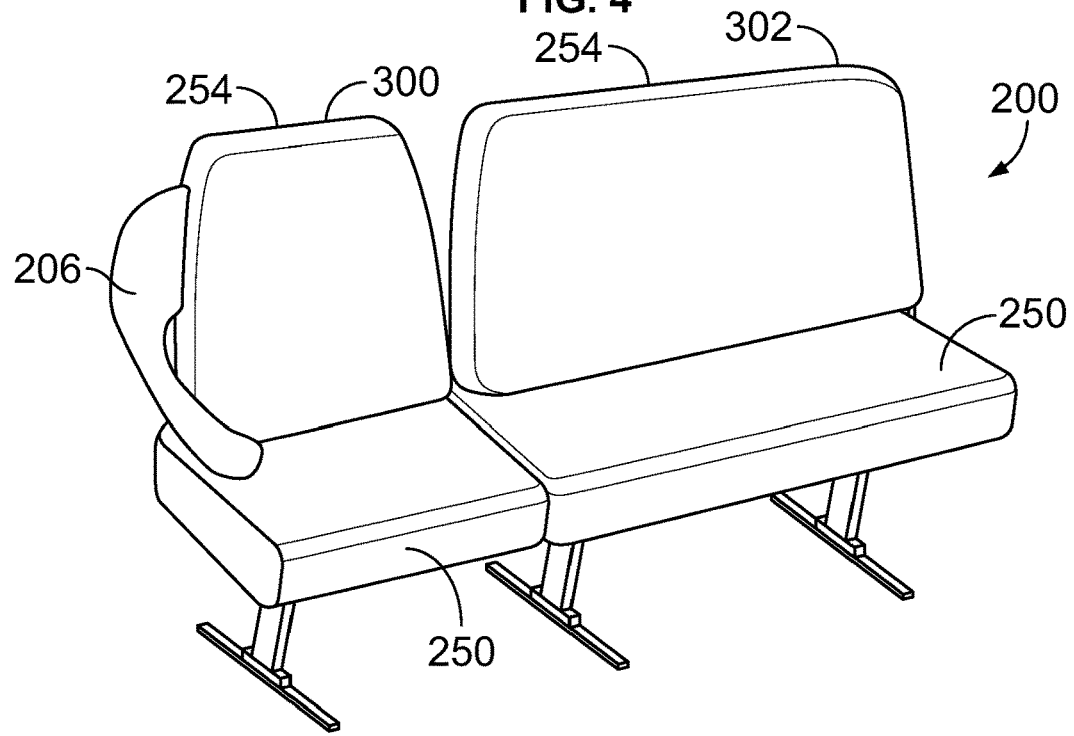
FIG. 5 illustrates a perspective front view of a seating system, according to an example of the present disclosure.

FIG. 5 illustrates a perspective front view of a seating system 200, according to an example of the present disclosure. The seating system 200 can include a moveable armrest 256 on one side. Optionally, the seating system 200 can include armrests 256 on both sides. As another example, an additional armrest 256 can be disposed inboard between armrests 256 on opposite sides.

Figure 6:
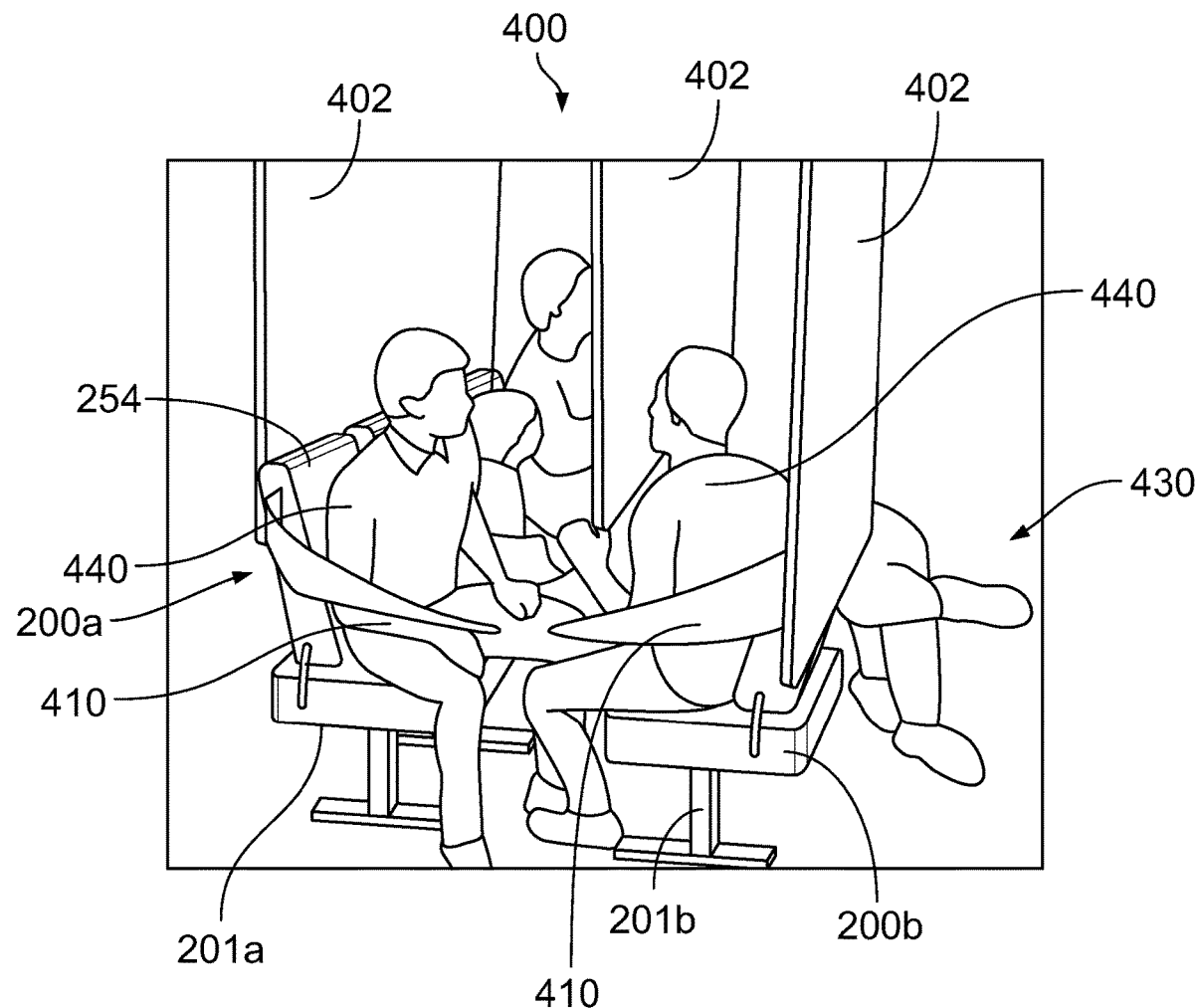
FIG. 6 illustrates a perspective lateral view of a group zone formed between two rows of seating systems, according to an example of the present disclosure.

FIG. 6 illustrates a perspective lateral view of a group zone 400 formed between two rows 201a and 201b of seating systems 200a and 200b, according to an example of the present disclosure. Partitions 402 can be secured to the seating systems 200a and 200b to separate different groups of passengers. The partitions 402 can be panels secured to the seating system 200a and 200b, such as to portions of the backrests 254. In at least one example, one or more group zones 400 provided by the seating systems 200a and 200b can be isolated from other areas of the internal cabin 430 by the partitions 402, which can enclose a particular group seating configuration.

The seating systems 200a and 200b can also include moveable tables 410 that are pivotally and/or rotatably coupled to the backrests 254 and/or armrests. The tables 410 can be moveably positioned, as desired. In at least one example, the tables 410 wrap around the backrest 254 and enable social interactions with other passengers in the same group. Optionally, the tables 410 can extend from various other locations, such as backrests, armrests, a base, or the like.

In at least one example, the tables 410 are configured to be manually manipulated and moved. The tables 410 can be pivotally coupled to portions of the seating systems. As another example, the tables 410 can be moveably coupled to one or more articulating arms. As another example, the tables 410 can be slidably coupled to one or more portions of the seating systems. As another example, the tables 410 can include one or more foldable portions that retract into and extend from portions of the seating systems. In at least one example, one or more actuators can be operatively coupled to the tables 410 to automatically move the tables 410 between different positions.

Referring to FIGS. 1-6, examples of the present disclosure provide adaptable seating systems and methods that are configured to provide groups zones 400 within an internal cabin 430 of an aircraft 100. The groups zones 400 are configured to accommodate associated groups of passengers 440, such as families. The group zones 400 allow groups of passengers 440, such as two to six passengers 440, to book a more comfortable and private seating arrangement that provides a more tailored experience during flight, and therefore starts their journey to a destination in a more personable way.

In at least one example, group zones 400 can replace certain current seating layouts within an internal cabin 430 of an aircraft 100. A group zone 400 within an internal cabin 430 provides passengers 440 more choice over a flight experience, and opens new sources of revenue for airlines.

Examples of the present disclosure provide seating systems and methods that are configured to selectively provide groups zones 400 in the internal cabin 430 of an aircraft 100. The group zones 400 allow associated groups of passengers 440 to be comfortably seated together and face each other after take-off and return to forward-facing for landing. Groups of passengers 440 are able to arrange seating to accommodate their particular group.

Figure 7:
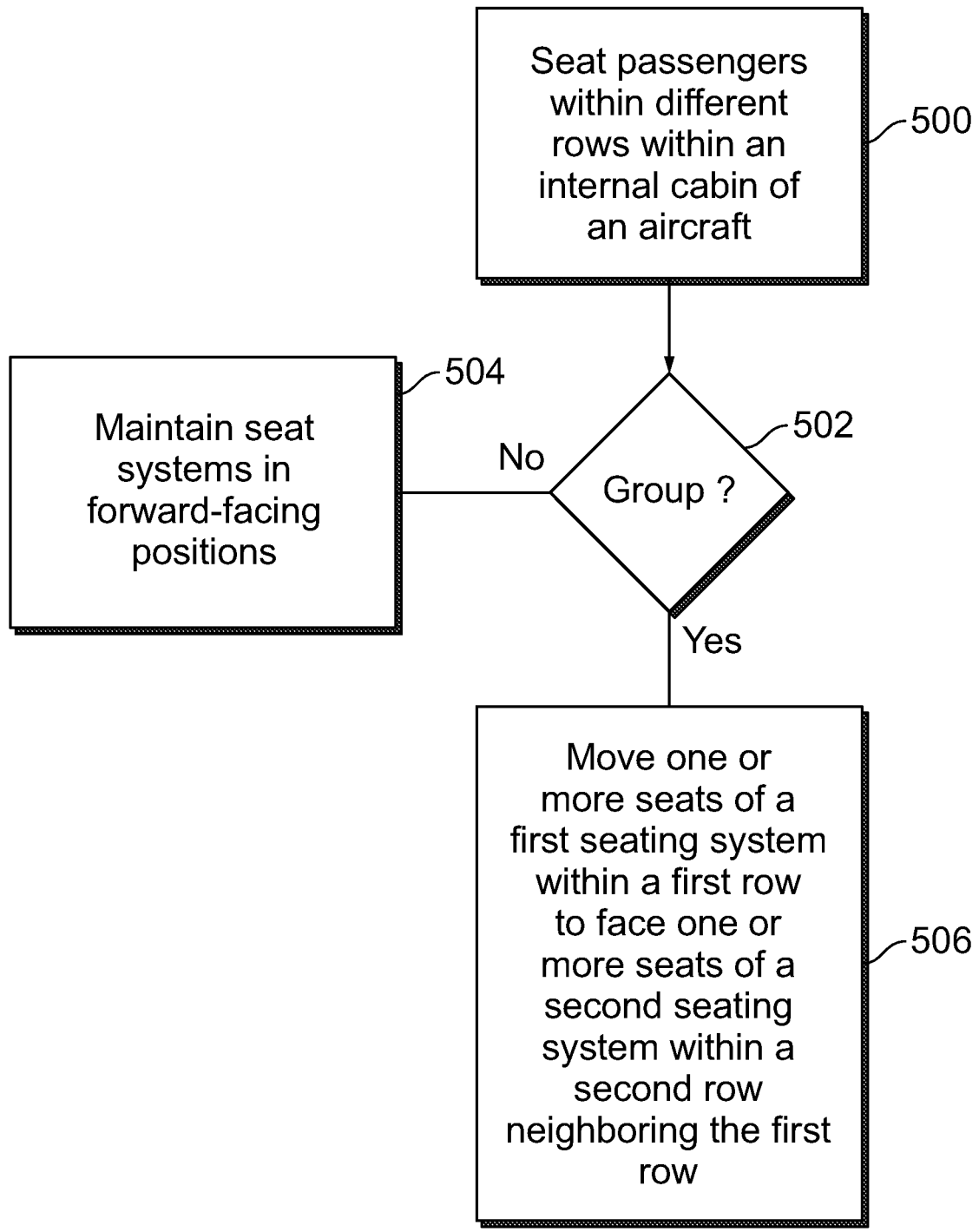
FIG. 7 illustrates a method of forming a group zone within an internal cabin of an aircraft, according to an example of the present disclosure.

FIG. 7 illustrates a method of forming a group zone within an internal cabin of an aircraft, according to an example of the present disclosure. At 500, passengers are seated within different rows within the internal cabin of the aircraft. At 502, it is determined if the passengers are within an associated group. If not, the method proceeds to 504, at which the seat systems are maintained in forward-facing positions. If, however, certain passengers are in associated group and desire to face each other, the method proceeds from 502 to 506, at which one or more seats of a first seating system within a first row are moved to face one or more seats of a second seating system neighboring the first row.

Further, the disclosure comprises examples according to the following clauses:

Clause 1. A seat system configured to be within an internal cabin of an aircraft, the seat system comprising:
one or more seat supports configured to support one or more seated passengers; and
one or more backrests moveably secured to the one or more seat supports, wherein the one or more backrests are selectively moveable between a forward-facing position and a rearward-facing position.

Clause 2. The seat system of Clause 1, wherein the one or more backrests in the rearward-facing position are configured to provide a group zone with another seat system behind the seat system.

Clause 3. The seat system of Clauses 1 or 2, further comprising one or more bases configured to be secured to seat tracks within the internal cabin.

Clause 4. The seat system of any of Clauses 1-3, wherein the one or more seat supports comprise one or more tracks that slidably support one or more couplers that connects to the one or more backrests.

Clause 5. The seat system of any of Clauses 1-4, wherein the one or more backrests are configured to slide between the forward-facing position and the rearward-facing position.

Clause 6. The seat system of any of Clauses 1-5, wherein the one or more seat supports and the one or more backrests provide a first passenger seating portion and a second passenger seating portion.

Clause 7. The seat system of Clause 6, wherein the first passenger seating portion and the second passenger seating portion are individual passenger seats.

Clause 8. The seat system of Clause 6, wherein the first passenger seating portion is an individual passenger seat, and the second passenger seating portion is a multi-passenger seat.

Clause 9. The seat system of any of Clauses 1-8, further comprising one or more partitions configured to separate different groups of passengers.

Clause 10. The seat system of any of Clauses 1-9, wherein the one or more partitions are secured to the one or more backrests.

Clause 11. The seat system of any of Clauses 1-10, further comprising one or more moveable tables coupled to the one or more backrests.

Clause 12. An aircraft comprising:
an internal cabin; and
seat systems within the internal cabin, the seat systems comprising:
one or more seat supports configured to support one or more seated passengers; and
one or more backrests moveably secured to the one or more seat supports, wherein the one or more backrests are selectively moveable between a forward-facing position and a rearward-facing position.

Clause 13. The aircraft of Clause 12, wherein the one or more backrests in the rearward-facing position are configured to provide a group zone with another seat system within the internal cabin.

Clause 14. The aircraft of Clauses 12 or 13, wherein the seat systems further comprise a base secured to seat tracks within the internal cabin.

Clause 15. The aircraft of any of Clauses 12-14, wherein the one or more seat supports comprise one or more tracks that slidably support one or more couplers that connects to the one or more backrests.

Clause 16. The aircraft of any of Clauses 12-15, wherein the one or more backrests are configured to slide between the forward-facing position and the rearward-facing position.

Clause 17. The aircraft of any of Clauses 12-16, wherein the one or more seat supports and the one or more backrests provide a first passenger seating portion and a second passenger seating portion.

Clause 18. The aircraft of Clause 17, wherein the first passenger seating portion and the second passenger seating portion are individual passenger seats.

Clause 19. The aircraft of Clause 17, wherein the first passenger seating portion is an individual passenger seat, and the second passenger seating portion is a multi-passenger seat.

Clause 20. The aircraft of any of Clauses 12-19, wherein the seat assemblies further comprise one or more partitions configured to separate different groups of passengers.

Clause 21. The aircraft of any of Clauses 12-20, wherein the seat assemblies further comprise one or more moveable tables coupled to the one or more backrests.

Clause 22. A method within an internal cabin of an aircraft, the method comprising:
selectively moving one or more backrests secured to one or more seat supports configured to support one or more seated passengers within the internal cabin of the aircraft between a forward-facing position and a rearward-facing position.

As described herein, examples of the present disclosure provide systems and methods for accommodating groups within an internal cabin of an aircraft. Further, examples of the present disclosure provide adaptable seating systems and methods that allow for socialization among groups of passengers without affecting flight experiences of other passengers.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat system configured to be within an internal cabin of an aircraft, the seat system comprising:
   one or more seat supports configured to support one or more seated passengers; and
   one or more backrests moveably secured to the one or more seat supports, wherein the one or more backrests are selectively moveable between a forward-facing position and a rearward-facing position,
   wherein the one or more seat supports and the one or more backrests provide a first passenger seating portion having a first width and a second passenger seating portion having a second width, wherein the first width is greater than the second width, and wherein the first passenger seating portion comprises a first multi-passenger seat configured to accommodate a first set of two or more passengers.

2. The seat system of claim 1, wherein the one or more backrests in the rearward-facing position are configured to provide a group zone with another seat system behind the seat system.

3. The seat system of claim 1, further comprising one or more bases configured to be secured to seat tracks within the internal cabin.

4. The seat system of claim 1, wherein the one or more seat supports comprise one or more tracks that slidably support one or more couplers that connects to the one or more backrests.

5. The seat system of claim 1, wherein the one or more backrests are configured to slide between the forward-facing position and the rearward-facing position.

6. The seat system of claim 1, wherein the second passenger seating portion is an individual passenger seat configured to accommodate a single passenger.

7. The seat system of claim 1, wherein the second passenger seating portion is a second multi-passenger seat configured to accommodate a second set of two or more passengers.

8. The seat system of claim 1, further comprising one or more partitions configured to separate different groups of passengers.

9. The seat system of claim 1, wherein the one or more partitions are secured to the one or more backrests.

10. The seat system of claim 1, further comprising one or more tables coupled to the one or more backrests.

11. The seat system of claim 10, wherein the one or more tables wrap around the one or more backrests.

12. The seat system of claim 1, wherein the first multi-passenger seat comprises a bench.

13. An aircraft comprising:
    an internal cabin; and
    seat systems within the internal cabin, the seat systems comprising:
      one or more seat supports configured to support one or more seated passengers; and
      one or more backrests moveably secured to the one or more seat supports, wherein the one or more backrests are selectively moveable between a forward-facing position and a rearward-facing position,
      wherein the one or more seat supports and the one or more backrests provide a first passenger seating portion having a first width and a second passenger seating portion having a second width, wherein the first width is greater than the second width, and wherein the first passenger seating portion comprises a first multi-passenger seat configured to accommodate a first set of two or more passengers.

14. The aircraft of claim 13, wherein the one or more backrests in the rearward-facing position are configured to provide a group zone with another seat system within the internal cabin.

15. The aircraft of claim 13, wherein the seat systems further comprise a base secured to seat tracks within the internal cabin.

16. The aircraft of claim 13, wherein the one or more seat supports comprise one or more tracks that slidably support one or more couplers that connects to the one or more backrests.

17. The aircraft of claim 13, wherein the one or more backrests are configured to slide between the forward-facing position and the rearward-facing position.

18. The aircraft of claim 13, wherein the second passenger seating portion is an individual passenger seat configured to accommodate a single passenger.

19. The aircraft of claim 13, wherein the second passenger seating portion is a second multi-passenger seat configured to accommodate a second set of two or more passengers.

20. The aircraft of claim 13, wherein the seat assemblies further comprise one or more partitions configured to separate different groups of passengers.

21. The aircraft of claim 13, wherein the seat assemblies further comprise one or more moveable tables coupled to the one or more backrests.

22. A method within an internal cabin of an aircraft, the method comprising:
    selectively moving one or more backrests secured to one or more seat supports configured to support one or more seated passengers within the internal cabin of the aircraft between a forward-facing position and a rearward-facing position, wherein the one or more seat supports and the one or more backrests provide a first passenger seating portion having a first width and a second passenger seating portion having a second width, wherein the first width is greater than the second width, and wherein the first passenger seating portion comprises a first multi-passenger seat configured to accommodate a first set of two or more passengers.

* * * * *